United States Patent [19]

Payne

[11] Patent Number: 5,511,341
[45] Date of Patent: Apr. 30, 1996

[54] GOOD NEIGHBOR HOUSE PLANT WATERING SYSTEM

[76] Inventor: Jessica Payne, P.O. Box 217, Orangeburg, N.Y. 10962

[21] Appl. No.: 401,112

[22] Filed: Mar. 9, 1995

[51] Int. Cl.$^6$ .................................................. A01G 25/00
[52] U.S. Cl. ................................. 47/79; 47/66; 239/302; 239/379
[58] Field of Search .................. 47/79 V, 79 C, 47/48.5 G, 48.5 R, 48.5 CR; 239/379, 302, 373

[56] References Cited

U.S. PATENT DOCUMENTS

| | | | |
|---|---|---|---|
| 872,696 | 12/1907 | Thomas | 239/379 |
| 4,300,309 | 11/1981 | Mincy | 47/48.5 G |
| 4,335,540 | 6/1982 | Allen | 47/79 |
| 4,653,529 | 3/1987 | Freeman | 137/453 |
| 4,805,342 | 2/1989 | Jenkins | 47/79 C |
| 4,848,029 | 7/1989 | Han | 47/79 |
| 5,097,626 | 3/1992 | Mordoch | 47/79 C |

FOREIGN PATENT DOCUMENTS

| | | | |
|---|---|---|---|
| 2683121 | 5/1993 | France | 47/79 V |
| 1151974 | 7/1963 | Germany | 47/48.5 G |
| 2058532 | 4/1981 | United Kingdom | 47/48.5 G |
| 91/07870 | 6/1991 | WIPO | 47/48.5 G |

OTHER PUBLICATIONS

Improvements Mail Order Catalog 1994.

*Primary Examiner*—Henry E. Raduazo
*Attorney, Agent, or Firm*—Mark E. Bender

[57] ABSTRACT

An automatic house plant watering system is provided allowing the user to control a constant slow flow of irrigating water to house plants during the extended absence of the user. User adjustable valves control the gravity outflow of water from a reservoir in the preferred embodiment, and a perforated threaded reservoir fill plug having a central bore for air pressure regulation is used to expose the fill hole and also for controlling atmospheric air inflow to the reservoir as an additional means of controlling the outflow of water. The user thus control irrigation flow by adjusting the at least one outflow valve and also by adjusting air inlet through the threaded fill plug. Conical ridged nipples on the at least one irrigation water outflow valve provides a friction fit for suitable flexible tubing to conduct water to individual plants to be watered. The present invention may be provided with casters, pull handles, a rolling cart, an air pump for positive reservoir air pressure, and a lamp mounting bracket.

13 Claims, 2 Drawing Sheets

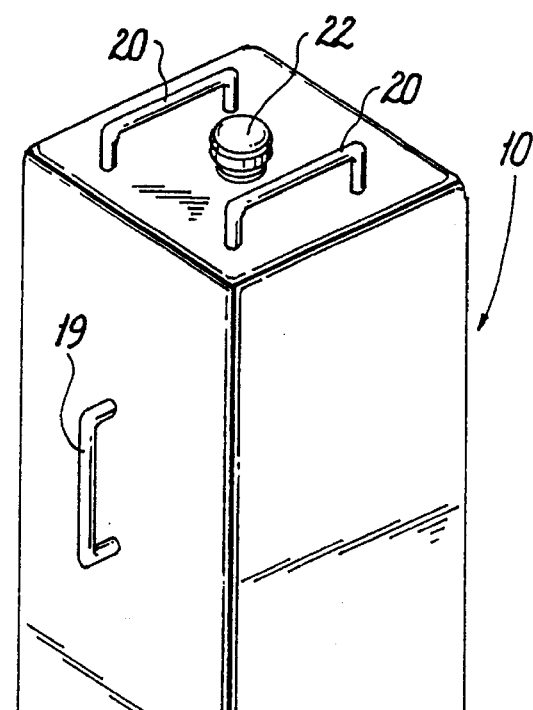
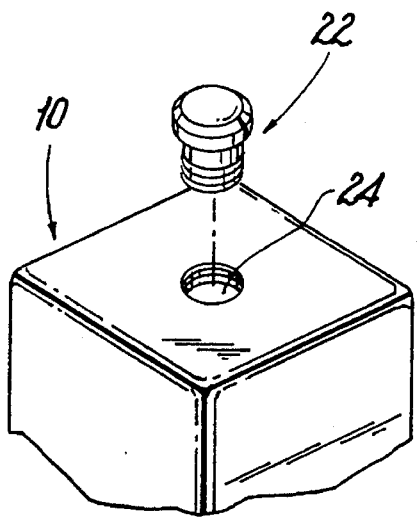
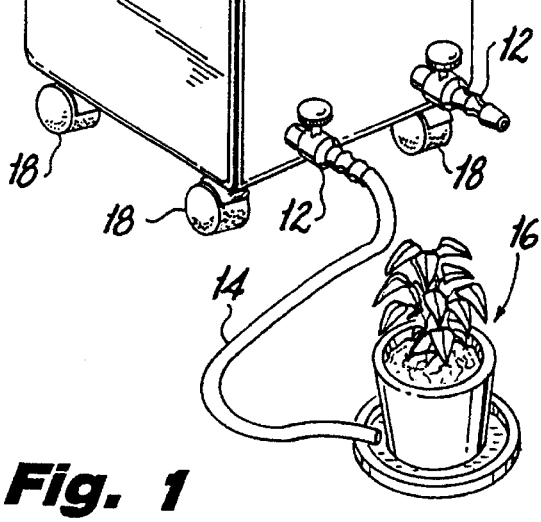
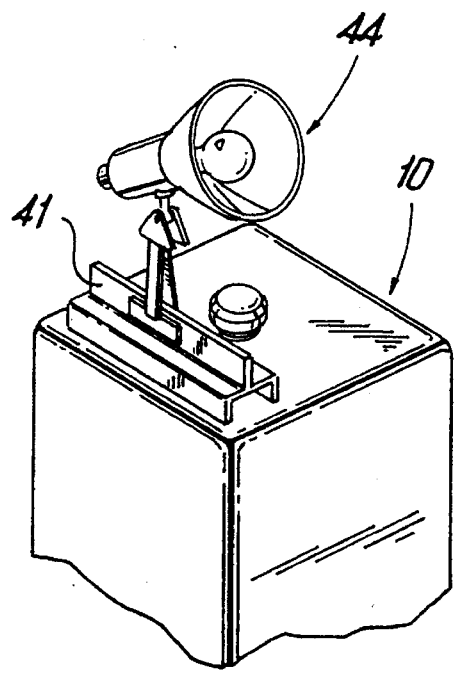
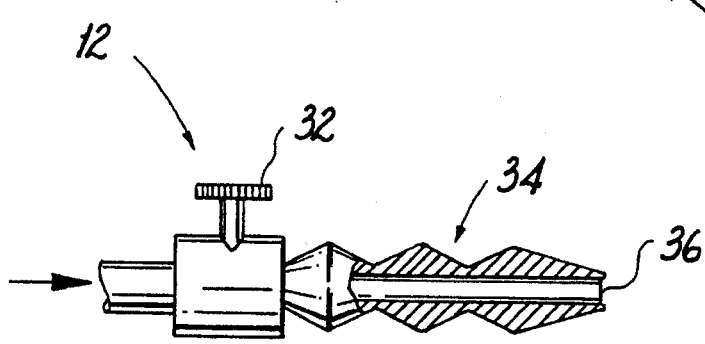
Fig. 1
Fig. 2
Fig. 3
Fig. 4

GOOD NEIGHBOR HOUSE PLANT WATERING SYSTEM

BACKGROUND OF THE INVENTION

Potted house plants have long been an important part of home and commercial decorating. House plants have created a pleasing and warm environment for people in many settings, as shown by the widespread sale and distribution of all kinds of houseplants, and by the appearance of house plants in such locations as residences, restaurants, retail stores, public buildings and institutions of all kinds.

Not only have house plants imparted an indoor environment which is inherently pleasing to people, but the growing and care of house plants has provided many people with an activity which is individually important and which provides devotees with a continuing source of reward and satisfaction.

For the foregoing reasons, the sale of houseplants and related goods comprises a significant element of commercial activity.

Until now, however, a problem with houseplants has been what arrangements a plant owner must make to keep the plants watered during the owner's extended absence, as, for example, when the owner takes a vacation or is otherwise absent for too long a time period to keep house plants properly watered. Until now, a houseplant owner had to rely upon other people to water plants, and in cases where the houseplants are in a private residence, the owner may have had to give a key to the residence to another person so as to permit access to the residence for the purpose of watering the owner's houseplants.

Such an arrangement as relying on another person to water an owner's houseplants in the owner's absence has many disadvantages. For example, the temporary person may not reliably carry out agreed-upon duties; or may not secure the owner's premises properly after water the houseplants, thus exposing the owner's premises to intruders. A temporary plant watering person may simply not be available to the houseplant owner. And the houseplant owner may not wish to have any temporary person enter the owner's residential or commercial premises in the owner's absence.

All of the foregoing creates a dilemma for an owner wishing to maintain decorative houseplants with sufficient water in the owner's absence.

The present invention is a device comprising a reservoir and drip controls which comprises a system of safe and reliable house plant watering for an owner who may be absent from the house plants for an extended time period or who may simply wish to have house plants which thrive with a minimum of individual watering attention from the owner.

Prior art systems of automatic plant watering have included U.S. Pat. No. 4,335,540 to Allen for a combined plant container and watering device which requires manual operation of a water spray pump in order to supply water to a house plant which is positioned in a container pot which is in turn surrounded by an outer circumferential container comprising a water reservoir. Allen's flower pot has one or more drain holes in the bottom of the soil-holding inner plant container to permit draining of excess water. But Allen does not provide for automatic supplying of water to the house plant. The operator must manually water the plant by using the spray pump. Allen's device is thus a decorative plant container having a water reservoir, but it critically fails to automatically water the plant or even to teach automatic watering.

U.S. Pat. No. 4,653,529 to Freeman provides for intermittent automatic plant watering. But Freeman provides for an integral tray and double reservoir system and has two separate integral air reservoirs. Freeman depends upon water evaporation to lower the level of water in his device to the point where clearance is provided for atmospheric air to enter an upper sealed air chamber with the result that a further quantity of water is released to the plant to be watered.

The disadvantage of Freeman is that if natural evaporation does not accurately match the plant's water requirement, the plant could dry out and enter water deprivation distress. Such a condition could occur, for example, where a relatively humid environment is combined with relatively strong sunlight and a rapidly growing plant. Rapid plant growth, driven by strong sunlight, would demand a relatively large amount of water. But a humid environment would retard evaporation of water from Freeman's device, thus retarding the rate at which intermittent Freeman irrigations would occur. The result would be underwater the plant. Over-water of a plant with Freeman could also easily occur, where plant water demand is relatively low and the environment has very low humidity, causing rapid evaporation which in turn would induce undesirably high frequency Freeman irrigations.

U.S. Pat. No. 4,848,029 to Han teaches another automatic intermittent plant watering system which, like Freeman, depends on natural evaporation of water to make the potted plant lighter in weight. In turn, the loss of weight from evaporated water trips a scale mechanism to actuate an irrigation valve, providing water to the plant from a reservoir until the mass of the potted plant is again large enough to tip the scale and thereby to shut off the water supply.

The problem with Han, U.S. Pat. No. 4,848,029 is similar to the problem with Freeman—natural evaporation is depended upon for intermittent plant watering. Without evaporation, and consequential weight loss, Han's device will not water the plant.

As with Freeman, Han's device will underwater a plant in a strong sunlight—high humidity situation, especially for a fast growing plant. And, similarly, both Han and Freeman will over-water a plant which grows slowly and requires little water in a very low-humidity environment.

While Han provides adjustability in the amount of weight loss which will trigger irrigation, Han fails to account for the gain in mass of a plant which occurs from the growth of the plant itself. Plants add mass not only from water and minerals added to the soil, but from carbon dioxide photosynthesized into woody plant material. Han does not account, for a gain in the plant's natural weight and thus the scale mechanism of Han is bound to be self defeating. In fact, the more weight the plant gains with Han, the less water it will get. This is a major penalty for a fast-growing house plant, leading to potentially very undesirable results with the invention of Han.

A device for attaching a water reservoir onto the pot of a house plant for wicked-siphon watering has been advertised in the Holiday 1994 retail mail-order sales catalog named IMPROVEMENTS Quick and Clever Problem Solvers. From the advertising text material, this device, called a Plant-sitter system, has a one-quart water tank that hangs on the side of a planter and a ceramic sensor cone together with a 33-inch long siphon tube which pulls water from the tank into the soil based on how dry the soil is.

Apparently the ceramic cone is porous and is able to utilize capillary action to actuate a water-filled siphon tube inserted into the one-quart water tank. Here too, as with Han and Allen, natural evaporation of water would seem to be critical to the Plant-sitter's operation. Too much evaporation would result in more copious siphoning and the plant could be over-watered. Too little evaporation would result in restricted and slow siphoning, and the plant could receive too little water.

In addition, the Plant sitter does not appear to provide for user control and is apparently not adjustable for rate of water flow, either.

What the Plant Sitter, Allen, Freeman and Han all fail to provide, and which is provided by the present invention is a constant, controllable, user-adjustable automatic system of drip-watering for house plants with which the user can experiment to find the appropriate flow rate for each and every individual house plant. With the present invention the user will be sure that the plant is watered, and the user will know, from prior experimentation and adjustment of the simple controls of the present invention, exactly how much water a given plant will receive.

The present invention is a plant watering system comprising at least one gravity flow reservoir with a removable, adjustable air-tight fill plug for water re-filling, and at least one user adjustable water outlet flow valve. The present invention allows the user to fill the reservoir and use both the air tight fill plug and the water release valve as dual controls to permit constant drip flowing or irrigation water from the reservoir into a plant saucer for conventional uptake of the water by the potted plant.

OBJECTS OF THE INVENTION

To overcome the disadvantages of the prior art, it is an object of the present invention to provide a constant drip-flow irrigation to house plants in the absence of the user.

It is a further object of the present invention to irrigate house plants automatically wherein the user may individually control the rate of watering to each plant to be watered.

It is yet another object of the present invention to irrigate house plants automatically and reliably.

It is another object of the invention to irrigate house plants automatically without relying upon evaporation of water as a critical component of the operation of the device.

It is still another object of the invention to irrigate house plants automatically without relying upon mass or weight of water as a critical component of the operation of the device.

It is still another object of the invention to irrigate house plants automatically without relying upon siphoning of water or capillary action as critical components of the operation of the device.

It is a further object of the invention to provide an optional positive air-pressure drive to pump irrigation water for house plants to a level above the reservoir, so as to water hanging house plants or plants located on shelves.

It is a further object of the present invention to provide a perforated and channeled fill plug so as to provide increased user control over air inflow into the reservoir so as to in turn provide control over the outflow rate of irrigation water.

It is a further object of the present invention to provide a houseplant irrigation reservoir in combination with a rolling household convenience cart, so as to elevate the reservoir for more convenient irrigation of hanging houseplants or houseplants on shelves elevated above the floor.

It is still another object of the present invention to provide a bracket disposed upon the reservoir for a user to conveniently attach a growing lamp so as to provide light for growing houseplants, It is also an object of the present invention to overcome the disadvantages of the prior art in other ways.

SUMMARY OF THE INVENTION

In keeping with the aforesaid objects of the invention and others which may become apparent, the present invention provides an air-tight water reservoir having a threaded adjustable fill plug. The fill plug is removed by unscrewing it from its threaded receptacle aperture, so that water can be added to the reservoir. The plug is then replaced, but is not screwed in to its full closed position, for to do so would prevent the entrance of atmospheric air into the top of the reservoir.

In a non-preferred embodiment, the threaded fill plug may be substantially solid. If it is solid, then the control of air to relieve vacuum in the airspace above the water level in the reservoir will occur as atmospheric air finds its way among the threads of the plug as it is carefully unscrewed by the user. Control of air flow, and thus vacuum relief and in turn control of flow rate of irrigation water is achieved by the user experimenting with the degree of air flow which properly irrigates a plant under specific circumstances.

The circumstances determining irrigation flow requirement comprise the type of plant, how much water the plant typically requires, the dryness of the atmosphere in which the plant is placed, the amount of light, natural or artificial, to which the plant is exposed, and the rate of the plant's growth.

Controlling the entrance of air into the top of the reservoir is a means of controlling the outflow of water from the present irrigation invention. As is well known, water will flow from the outlet of any airtight reservoir upon being permitted a gravity-driven exit and further upon the replacement of the volume of water with an equal volume of atmospheric air. Preventing air entrance merely creates a vacuum which eventually stops the water outflow.

Controlling airflow to relieve the vacuum pressure can also be achieved by a novel design for the threaded fill plug. In a preferred embodiment, the present invention may have a threaded fill plug having a central bore running from the bottom of the plug upward, with the bore being sealed from airflow contact at its upper end. The bore is open to the air in the space above the water level in the reservoir when the fill plug is in place in the reservoir body.

In addition to the bore, the preferred fill plug is provided with at least one radially disposed pinhole airflow channel. The at least one airflow channel extends radially from the threaded circumference of the fill plug directly to the bore. It is critical that the at least one radial pinhole airflow channel be in airflow communication with the bore. The radial pinhole airflow channel must be of sufficiently narrow diameter to ensure that the flow of air therethrough is very slow.

The user thus would initiate very slow reservoir vacuum relief by exposing a single such pinhole by unscrewing the threaded fill cap. Since at least one such radial airflow channel is provided and, preferably numerous vertically spaced-apart radial airflow channels will be provided, the user control of vacuum relief may be provided by unscrewing the threaded fill plug slowly—and thus exposing the radial vertically spaced-apart airflow channels one at a time. The user might typically need to expose multiple pinholes by unscrewing the fill cap to an experimentally determined extent so as to regulate vacuum relief and thus provide a desired gravity flow of plant irrigation water.

In so doing, the user will permit ambient atmospheric air to enter the bore at a controlled rate. If a single radial airflow channel is exposed by unscrewing the fill plug by a minimal amount, then airflow into the bore, and thus into the air space above the water level in the reservoir, will be minimized, but nonetheless controlled.

Controlling the inflow of air, then, is a means of controlling the outflow of water from the irrigation reservoir. But the water outflow is also controlled with a constricting outflow valve.

Well known in chemical and other laboratory facilities are valves with conical ridged outflow nipples for both water and gas. In a typical laboratory, plastic or rubber tubing is attached to the ridged conical valve nipple in a water-tight seal to conduct the water or gas to its destination.

The present invention may use a simple laboratory-type valve available from any commercial source. The valve may be a simple valve or may have relatively elaborate conventional threaded flow control components so as to give the user more precise control over the flow of Water through the valve.

In the preferred embodiment of the present invention the irrigation water is conducted from the reservoir by gravity feed through the at least one user adjustable outlet control valve to a plant to be watered by means of suitable rubber or plastic tubing. The flow valve is not only adjustable, but its outflow aperture comprises a constriction.

In the present invention, the outflow valve constriction is an important element because it restricts the ability of atmospheric air to enter the valve in response to a growing reservoir vacuum pressure so as to replace the volume of water exhausted from the reservoir.

If no control on air entry into the reservoir were provided by means of the adjustable fill plug, air would be substantially unable to enter the restricted opening of the outflow valve, and water would stop flowing from the reservoir altogether.

Therefore, in the present invention, the user must adjust two controls—the irrigation water outflowing from the flow valve, and, the user must also adjust the rate of air inflow permitted to enter the reservoir.

Typically, when a user leaves the premises where plants are to be watered, the desired watering will occur in very slow, drip fashion. The rate of flow is to be experimented with by the user in advance so as to ensure neither over nor under watering.

In this manner, the user will be certain: of the appropriate result.

In addition, the reservoir may be provided with multiple outlet valves, since different houseplants may individually need differing rates of flow. Adjusting each outlet valve to a different flow rate will require the additional ability to control air inflow to the reservoir—which the present invention provides by means of the adjustable sealable fill plug.

The reservoir of the present invention may be provided with casters for rolling it on a floor conveniently to a desired location.

At least one carrying handle may be affixed to a convenient location on the reservoir for easy user carrying and lifting, especially when the reservoir is empty.

The preferred embodiment of the present invention is further provided with at least one bracket for mounting artificial plant-growing illumination. Many kinds of grow lamps are commercially available and means for attachment to the bracket of the present invention are entirely conventional. Any suitable bracket using any suitable means of attachment to the reservoir of the present invention will serve to provide the user with a convenient source of artificial illumination. Lamps having friction-grabbing spring clamps are conveniently installed and adjusted by the user.

In a non-preferred embodiment of the present invention, the reservoir, with its casters, may be mounted upon a household utility rolling cart. The rolling cart will provide the reservoir with additional elevation for conveniently irrigating houseplants at a variety of elevations above the user's floor level—without having to resort to pumping or increased air pressure in the reservoir. The rolling cart is provided with securing means to prevent the reservoir, with its casters, from rolling about upon the surface of the cart.

Also in a non-preferred embodiment, the present invention may be provided with an air pump. A user actuated manual piston pump will serve adequately. The air pump is for the purpose of creating positive air pressure in the reservoir air space for the purpose, in turn, of pumping irrigation water from the reservoir outflow means. The reason for the pumped irrigation water, rather than on gravity-fed irrigation water as in the preferred embodiment of the present invention, is to provide irrigation in situations where the plant to be watered is elevated—as where the plant hangs in a basket or is placed on a shelf elevated above the level of the reservoir of the present invention.

As with the preferred embodiment, user experimentation with compressing the air above the water in the reservoir to achieve a desired irrigation rate will be required.

BRIEF DESCRIPTION OF THE DRAWINGS

The invention can best be understood is conjunction with the drawings, in which FIG. 1 shows a perspective view of the reservoir of the present invention.

FIG. 2 is an exploded cut away view of the top portion of the reservoir showing the threaded fill plug in relation to the matching threaded receptacle aperture of the reservoir.

FIG. 3 is a cut away cross section view of an irrigation outlet valve.

FIG. 4 is a perspective cutaway view showing the reservoir with a lamp bracket mounted on the top of the reservoir. A clamped-on lamp is also shown.

DETAILED DESCRIPTION OF THE DRAWINGS

Figure 5:
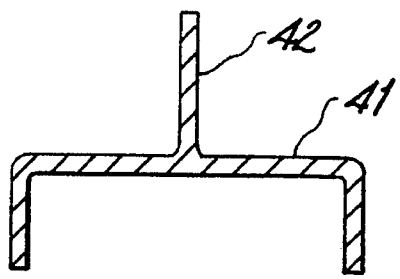
FIG. 5 is a schematic end view of a lamp bracket shown in FIG. 4.

FIG. 1 shows a perspective view of the reservoir 10 of the present invention having outlet irrigation valves 12 with irrigation tubing 14 extending therefrom to a plant to be watered 16. Threaded fill plug 22 is shown seated in the top of the reservoir. Casters 18 make it convenient for a user to roll the reservoir to a desired position and at least one grab handle 19 permits easy and convenient directional rolling guidance on a floor by the User. At least one top grab handle 20 make it convenient for the user to lift and carry the reservoir, particularly when the reservoir is empty.

FIG. 2 is a cut away exploded view of the top of the reservoir showing the threaded fill plug 22 in relation to matching threaded aperture 24. Threaded plug 22 is rotatable between a fully removed open position and a fully closed position in which plug 22 prevents the movement of atmospheric air into the reservoir. Threaded plug 22 is adjusted by the user to a nearly closed position during use so as to admit air into the reservoir very slowly. In turn, slow admission of air into the reservoir replaces the volume of water which is constantly draining into plants being watered when the present invention is in use.

Full closing of the threaded fill plug will create a vacuum in the reservoir above the water line. Such a vacuum will ultimately prevent irrigation water from flowing through the restricted opening of irrigation valve. Thus, Threaded fill plug 22 must be adjusted by the user so as to admit air slowly into the reservoir so as to permit controlled release of irrigation water.

User experimentation with adjustment of fill plug 22 and with adjustment of irrigation outlet valves 12 is necessary to achieve a desired irrigation rate, before the present invention can accurately irrigate individual plants. There is no substitute for user adjustment if the proper irrigation rate is to be achieved, since a proper rate of irrigation will depend upon such factors as the rate of individual plant growth, the type of plant and the amount of soil moisture appropriate for it, the typical ambient humidity in the room where a plant is to be watered, and the duration, direction and amount of sunlight to which the plant to be watered is exposed.

FIG. 3 is a cut away cross section of a conventional adjustable flow valve 12 having a conventional laboratory-style ridged conical nipple 34 with restricted flow aperture 36 and user adjustment 32. Details of internal construction of valve 12 are not part of the novelty of the present invention, and any suitable construction is acceptable to allow a user to adjust the rate of irrigation water flowing to a typical slow, dripping rate of exit from valve 12.

FIG. 4 shows a cutaway perspective view of the reservoir 10 having a lamp mounting bracket 41 mounted thereon, mounting bracket 41 being any suitable bracket for the mounting of a plant-growing lamp, with bracket 41 being suitably fixed and mounted to reservoir 10. Lamp 44 having a spring-clamp is attached to bracket 41 by friction. Lamp 44 may be conveniently adjusted, moved or removed by the user.

FIG. 5 shows an end-view cross section of mounting bracket 41 having a vertical mounting member 42 for use in affixing a plant growing lamp to the irrigation reservoir of the present invention.

Figure 6:
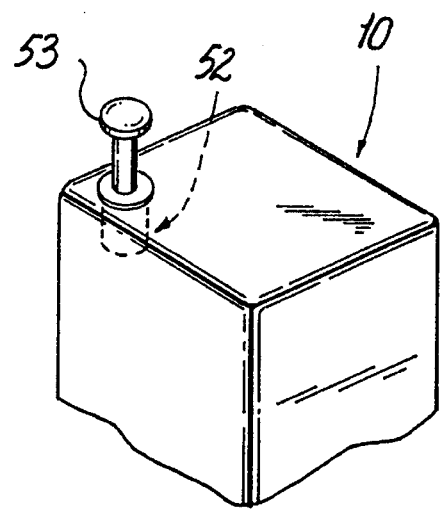
FIG. 6 is a perspective cutaway view showing the reservoir having a top-mounted user actuated manual piston air pump.

FIG. 6 shows a cutaway view of reservoir 10 having air pump 52 with piston pumping handle 53 to permit a user to increase air pressure in the air space above the water level in reservoir 10, and thereby to pump irrigation water from the outlet means 12.

Figure 7:
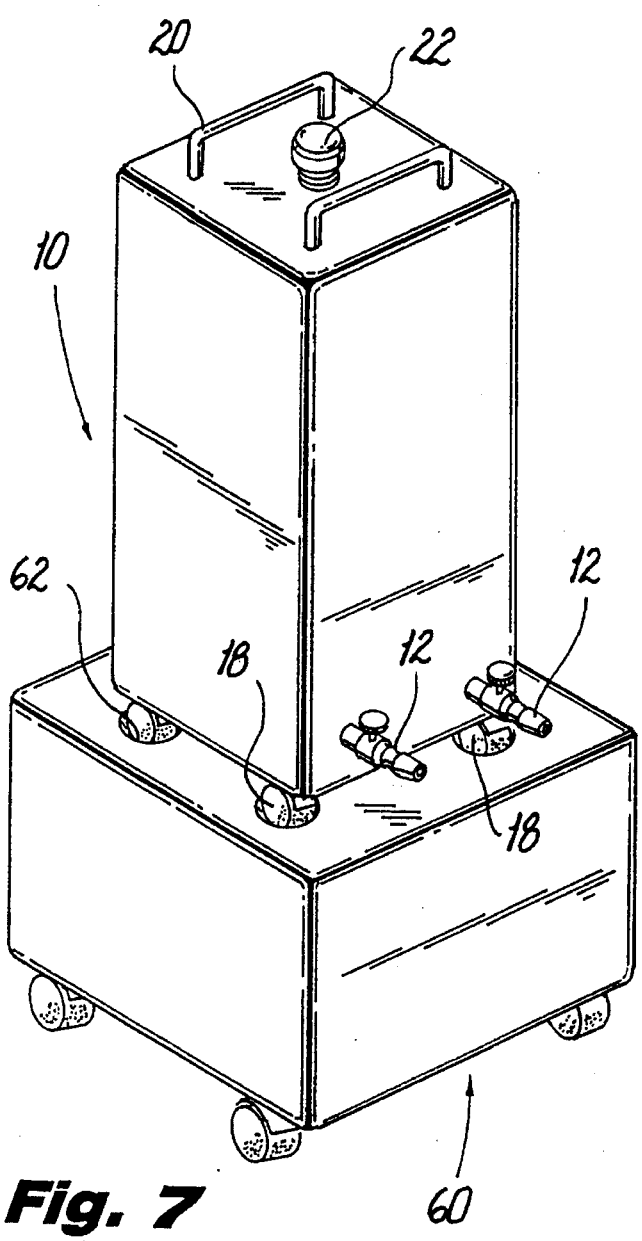
FIG. 7 is a perspective view showing the reservoir of the present invention mounted upon a rolling household utility cart.

FIG. 7 is a perspective view showing reservoir 10 mounted upon utility rolling cart 60 for providing reservoir 10 with additional elevation. Rolling cart 60 is provided with conventional securing means 62, which may be brackets or hollow spaces on the surface of cart 60, so as to prevent reservoir 10, which also has casters, from rolling about on the surface of cart 60.

Figure 8:
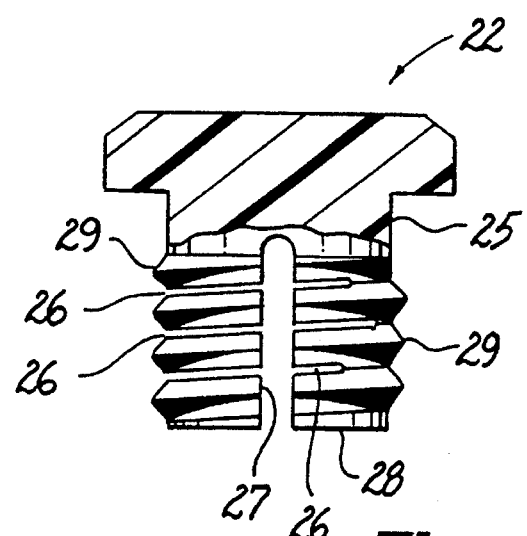
FIG. 8 is a cross-section showing a threaded fill plug having a bore with radially disposed vertically spaced-apart air flow channels.

FIG. 8 is a cross-section of threaded Fill plug 22, showing threads 29, bottom 28, solid body section 25, with a central longitudinal bore 27 open at the bottom and sealed at the top, and at least one radial air channel 26 extending radially from central bore 27 to the threaded circumference of plug 22. Air channels 26 provide air flow communication with the ambient atmosphere at the threaded circumference 29 to and with the central bore 27, so as to permit a user to unscrew threaded fill plug 22 and thereby expose air channels 26 one at a time—thereby providing control over the amount and rate of airflow into the airspace in the reservoir—so as to regulate the vacuum pressure therein and ultimately regulate the flow of irrigation water to plants to be watered by the present invention. Air channels 26 are vertically spaced apart with relation to bottom 28 of plug 22, so that unscrewing plug 22 will cause vertical motion of plug 22, and will thus sequentially expose at least one air channel 26.

Further modifications may be made to the present invention without departing from its scope, as noted in the appended claims.

What is claimed is:

1. A user-adjustable house plant irrigation system, comprising:

a. an air-tight water reservoir having a removable fill plug, the fill plug having means for adjusting the inlet of atmospheric air into the reservoir; the water reservoir further having b. at least one water outflow valve having means for user adjustability; and the irrigation system further having c. means for transferring water from the outflow valve to a houseplant to be irrigated; and wherein further the means for adjusting the inlet of atmospheric air is a fill plug having threaded relationship with a matching threaded receptacle aperture in the reservoir, for user rotation of the threaded fill plug between a fully closed air tight position and a fully open position for refilling the reservoir with water, such that fill plug rotation positions intermediate between full open and full closed permit user control of flow of atmospheric air into the reservoir.

2. The device of claim 1 wherein the at least one water outflow valve adjustability means comprises user-controlled flow adjustment means.

3. The device of claim 2 wherein the user-controlled flow adjustment means comprises a valve handle.

4. The device of claim 3 wherein the at least one outflow valve further comprises means for sealably accepting irrigation tubing.

5. The device of claim 4 wherein the at least one outflow valve means for sealably accepting irrigation tubing comprises a conical ridged nipple for watertight friction grasping of irrigation tubing attached to the nipple.

6. The device of claim 5 wherein the reservoir is further provided with a plurality of casters for convenient rolling of the reservoir to a desired location.

7. The device of claim 6 wherein the reservoir is further provided with at least one carrying handle.

8. The device of claim 7 wherein the threaded fill plug comprises a bottom, the fill plug having a bore therein extending longitudinally from the bottom, the bore having an open bottom and a sealed top permitting free entry and exit of atmospheric air to and from the bottom of the bore; and the fill plug further having at least one radially disposed airflow channel disposed within the fill plug, the at least one airflow channel extending radially from the circumference of the fill plug to the fill plug bore, the at least one radially disposed airflow channel being in airflow communication with the fill plug bore and with the ambient atmosphere at the fill plug circumference, for permitting air flow through the at least one air flow channel to and from the fill plug bore.

9. The device of claim 8, the threaded fill plug having at least two airflow channels extending radially from the circumference of the fill plug to the fill plug bore, wherein the at least two radial airflow channels are vertically spaced apart in relation to the fill plug bottom.

10. The device of claim 9, having at least one bracket for mounting a lamp thereon.

11. The device of claim 10, further having an air pump, for creating positive air pressure in the reservoir air space above the water level therein.

12. The device of claim 11, further being combined with a rolling cart comprising a convenient system of elevation for the reservoir.

13. The device of claim 7, wherein the threaded fill plug is substantially solid.

\* \* \* \* \*